United States Patent
Rimbaud et al.

(10) Patent No.: US 11,358,735 B2
(45) Date of Patent: Jun. 14, 2022

(54) GROUND PROXIMITY WARNING SYSTEM FOR AN AIRCRAFT, ASSOCIATED AVIONICS AND METHOD

(71) Applicant: DASSAULT AVIATION, Paris (FR)

(72) Inventors: Florent Rimbaud, Saint Ouen (FR); Frank Renaud, Arles (FR)

(73) Assignee: DASSAULT AVIATION, Paris (FR)

( * ) Notice: Subject to any disclaimer, the term of this patent is extended or adjusted under 35 U.S.C. 154(b) by 305 days.

(21) Appl. No.: 15/915,703

(22) Filed: Mar. 8, 2018

(65) Prior Publication Data

US 2018/0265218 A1 Sep. 20, 2018

(30) Foreign Application Priority Data

Mar. 9, 2017 (FR) ...................... 17 00244

(51) Int. Cl.
| | |
|---|---|
| *B64D 45/04* | (2006.01) |
| *G08G 5/04* | (2006.01) |
| *G08G 5/00* | (2006.01) |
| *G05D 1/06* | (2006.01) |
| *G01C 5/00* | (2006.01) |

(52) U.S. Cl.
CPC .......... *B64D 45/04* (2013.01); *G05D 1/0646* (2013.01); *G08G 5/0021* (2013.01); *G08G 5/0086* (2013.01); *G08G 5/045* (2013.01); *G01C 5/005* (2013.01)

(58) Field of Classification Search
CPC .... B64D 45/04; G05D 1/0646; G08G 5/0021; G08G 5/0086; G08G 5/045; G08G 5/025; G08G 5/0078; G01C 5/0005; Y10T 464/20; G08B 29/16; H04L 12/242
See application file for complete search history.

(56) References Cited

U.S. PATENT DOCUMENTS

| | | | |
|---|---|---|---|
| 4,551,723 A | | 11/1985 | Paterson |
| 4,748,569 A | * | 5/1988 | Gordon ................. G05D 1/102 244/17.13 |

(Continued)

FOREIGN PATENT DOCUMENTS

| | | |
|---|---|---|
| EP | 2237126 A1 | 10/2010 |
| FR | 2545930 A1 | 11/1984 |

(Continued)

OTHER PUBLICATIONS

Corresponding French Search Report for FR1700244.

*Primary Examiner* — Christian Chace
*Assistant Examiner* — Aaron C Smith
(74) *Attorney, Agent, or Firm* — Davidson, Davidson & Kappel, LLC

(57) ABSTRACT

A ground proximity warning system for an aircraft includes a plurality of alarm generators, each able to generate an alarm by verifying evolution conditions of the aircraft specific to each alarm generator, the verification using data obtained from at least one measuring sensor of the aircraft. The ground proximity warning system includes a unit for selective deactivation of at least some of the alarm generators, able to be implemented during a search and rescue mission carried out by the aircraft, and an auxiliary alarm generator, capable of emitting a ground proximity alarm based on the safety height chosen for the search and rescue mission, when the selective deactivation unit is implemented.

15 Claims, 4 Drawing Sheets

(56) References Cited

U.S. PATENT DOCUMENTS

| | | | |
|---|---|---|---|
| 4,924,401 A | 5/1990 | Bice et al. | |
| 5,001,476 A | 3/1991 | Vermilion et al. | |
| 6,002,347 A * | 12/1999 | Daly | G01S 13/91 |
| | | | 340/963 |
| 2002/0030607 A1 * | 3/2002 | Conner | B64C 27/82 |
| | | | 340/945 |
| 2008/0319671 A1 * | 12/2008 | Subelet | G08G 5/0086 |
| | | | 701/301 |
| 2009/0015438 A1 * | 1/2009 | Sorbier | G08G 5/0021 |
| | | | 340/963 |
| 2010/0250034 A1 | 9/2010 | Bouchard et al. | |
| 2010/0286851 A1 * | 11/2010 | Ishihara | G08G 5/0021 |
| | | | 701/9 |
| 2011/0251741 A1 * | 10/2011 | Fleury | G08G 5/0052 |
| | | | 701/9 |
| 2011/0276201 A1 * | 11/2011 | Block | G08G 5/025 |
| | | | 701/9 |
| 2015/0170527 A1 * | 6/2015 | Filias | G08G 5/045 |
| | | | 701/301 |
| 2016/0275801 A1 * | 9/2016 | Kopardekar | G08G 5/0043 |

FOREIGN PATENT DOCUMENTS

| | | |
|---|---|---|
| GB | 2139589 A | 11/1984 |
| WO | WO0190694 A2 | 11/2001 |

* cited by examiner

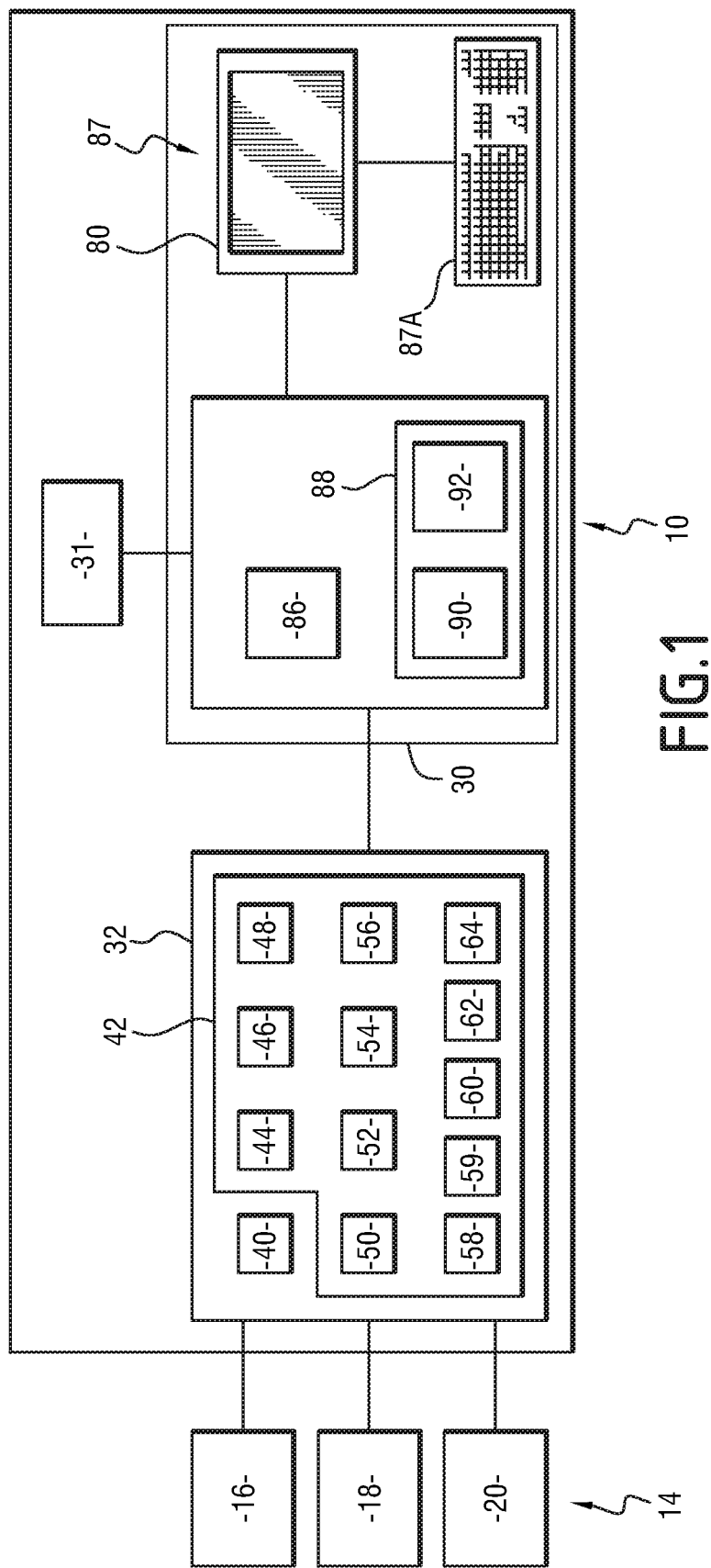

GROUND PROXIMITY WARNING SYSTEM FOR AN AIRCRAFT, ASSOCIATED AVIONICS AND METHOD

The present disclosure relates to a ground proximity warning system for an aircraft, including:

a module for recovering data coming from at least one sensor measuring an evolution parameter of the aircraft;

a plurality of alarm generators, each able to generate an alarm by verifying evolution conditions of the aircraft specific to each alarm generator, the verification using data obtained from the or each measuring sensor.

Such a system is in particular intended to assist the crew of an aircraft in carrying out search and rescue missions, using an aircraft.

These missions for example include maritime surveillance, for monitoring ships traveling in a zone, releasing a parcel, in particular a rescue and recovery chain, or the search for an individual who has fallen in the sea.

Such missions involve having the aircraft follow very specific search and rescue trajectories. These trajectories are for example a series of increasingly large square profiles, trajectories in angular sectors, creeping ladder trajectories and/or parallel trajectories.

During these missions, the aircraft flies at a low altitude, or even a very low altitude, to be able to observe the surface of the sea, and/or to release parcels. The altitude at which the mission is carried out is for example comprised between 1524 m (5000 feet) and 91 m (300 feet), and periodically up to 30 m (100 feet) above the surface, over long durations that may reach several hours.

BACKGROUND

Old-generation apparatuses, operated by soldiers, generally do not have any ground proximity protection system.

On the contrary, modern civilian aircraft are generally provided with an enhanced ground proximity warning system (EGPWS). This system is a significant component of the aircraft's safety during normal flight, since it makes it possible to detect situations in advance in which the aircraft may come into contact with the ground, in particular during takeoff and landing phases.

The term "ground" indifferently refers to a solid surface on land, or the liquid surface of a body of water, such as a river, lake, sea or ocean.

The ground proximity warning system comprises several alarm generators that generally operate based on data from a radio-altimeter, and an inertial unit, using, for some alarm generators, a terrain database, in order to signal potential collision situations as a function of the trajectory of the aircraft.

The alarm generators are for example capable of detecting an excessive sink rate, an excessive approach speed with respect to the ground, a loss of altitude after takeoff or with a major adjustment to engine power, a dangerous terrain crossing, an excessive deviation relative to a descent guide slope, an excessive roll angle, and/or a wind shear situation.

SUMMARY OF THE INVENTION

When they are used in civil aviation, such systems are in practice relevant over a very short length of time, since the aircraft is only close to the ground in the takeoff and landing phases.

In the context of search and rescue missions, such a warning system would not be appropriate, since it could repetitively cause a large number of alarms, given the long presence of the aircraft near the ground, and the particular trajectories followed by the aircraft.

Although the warning system is, in civilian flight, a major safety element for the aircraft, it is completely unsuitable for the aforementioned missions, and would bother the crew during the performance of these missions.

In particular, the alarms emitted could no longer be taken into account by the crew, whereas some of them could reflect a truly dangerous situation for the aircraft, undermining its safety.

One aim of the invention is therefore to have a system for protecting the aircraft from a potential collision with the ground, which nevertheless makes it possible to perform particular search and rescue missions without bothering the crew and while guaranteeing the safety of the aircraft.

An aircraft ground proximity warning system is provided including:

a module for selective deactivation of at least some of the alarm generators, able to be implemented during a search and rescue mission conducted by the aircraft;

an auxiliary alarm generator capable of emitting a ground proximity alarm based on a safety height chosen for the search and rescue mission when the selective deactivation module is implemented.

The system according to the invention may comprise one or more of the following features, considered alone or according to any technically possible combination:

the alarm generated by the or each alarm generator and/or by the auxiliary alarm generator is a sound alarm, a visual alarm and/or a tactile alarm;

it comprises a module allowing a crew member to adjust the selected safety height;

the safety height can be selected at least between 15 m and 762 m;

it comprises an interface module able to cause the display, during the implementation of the deactivation module, of an indication to deactivate some of the alarm generators on the flight or navigation parameter tracking screen;

a first sensor for measuring an evolution parameter of the aircraft is an altitude measuring sensor of the aircraft and a second sensor for measuring an evolution parameter of the aircraft is a sensor for measuring the vertical speed of the aircraft;

the auxiliary alarm generator is able to emit a ground proximity alarm as a function of the safety height, the altitude measured by the first measuring sensor, the vertical speed of the aircraft measured by the second measuring sensor, and a predetermined anticipation time;

the auxiliary alarm generator is able to compare the safety height to the difference between the altitude, measured by the first measuring sensor, and the product of the vertical speed of the aircraft, measured by the second measuring sensor, multiplied by the predetermined anticipation time;

the anticipation time is determined as a function of the selected safety height, and is in particular comprised between 5 seconds and 0 seconds;

the selective deactivation module keeps at least one alarm generator active during the surveillance and rescue mission;

the at least one alarm generator kept active is chosen from among an excessive sink rate alarm generator, an alarm generator for excessive deviation with respect to a slope guide signal, an alarm generator for crossing dangerous terrain and/or a wind shear alarm generator.

Aircraft avionics are also provided, including:

a flight management system, able to be switched between a normal piloting mode and a search and rescue mission mode;

a warning system as defined above, the selective deactivation module remaining idle in the normal piloting mode and being able to be implemented in the search and rescue mission mode.

A ground proximity warning method for an aircraft is also provided, including the following steps:

providing a warning system as defined above;

during a search and rescue mission, selectively deactivating at least some of the alarm generators, via the selective deactivation module;

the emission, by the auxiliary alarm generator, of a ground proximity alarm as a function of a safety height chosen for the search and rescue mission when the selective deactivation module is implemented.

The method according to the invention may comprise one or more of the following features, considered alone or according to any technically possible combination:

an adjustment of the chosen safety height by a crew member via a module for adjusting the safety height;

emitting an alarm, via the auxiliary alarm generator, as a function of the safety height, for a measured altitude of the aircraft, a measured vertical speed of the aircraft, and a predetermined anticipation time.

BRIEF SUMMARY OF THE DRAWINGS

The invention will be better understood upon reading the following description, provided solely as an example and done in reference to the appended drawings, in which:

FIG. 1 is a schematic view of aircraft avionics including a ground proximity warning system according to an embodiment of the invention;

DETAILED DESCRIPTION

An avionics system 10 of an aircraft according to an embodiment of the invention is illustrated schematically in FIG. 1. The avionics system 10 is in particular intended for the implementation, by the aircraft, of search and rescue trajectories 112, during search and rescue missions conducted by the aircraft.

Examples of search and rescue trajectories 112 are illustrated by FIGS. 5 to 8. These trajectories are for example defined in the International Aeronautical and Maritime Search and Rescue (IAMSAR) Manual published by the ICAO.

Figure 5:
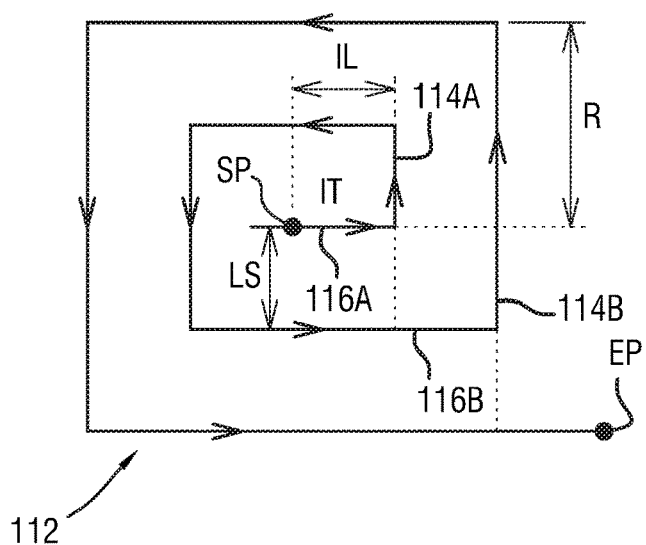
FIGS. 5 to 8 illustrate several search and rescue trajectories able to be carried out using the avionics system according to an embodiment of the invention.

The search and rescue trajectory 112 illustrated by FIG. 5 is a so-called "expanding squares" trajectory.

It in particular applies to the search for a lifeboat from a last known position.

It is made up of successive segments that follow the contour of squares 114A, 114B that are substantially homothetic with respect to one another relative to the starting point SP of the trajectory.

The trajectory 112 does not follow the complete contour of each square 114A, 114B, but has a respective connecting segment 116A, 116B between the starting point SP and a first square 114A, then between each square 114A and the square 114B of the expanse just above that of the square 114A.

The expanse of the square 114B is, however, dependent on the visibility over the zone allowing an intersection between two successive branches corresponding to two successive squares 114A, 114B. Respect for this spacing guarantees 100% coverage of the search zone.

Such a trajectory 112 is therefore defined by a starting point SP, an initial travel direction IT, an initial length IL of a first connecting segment 116A defining the half-side of the first square 114A, a line spacing LS defining the spacing between the first connecting segment 116A and the second connecting segment 116B connecting the first square to the second square, a trajectory radius R that will be defined below, and a turning direction (in the clockwise or counterclockwise direction).

The trajectory 112 starts from the starting point SP and follows the initial travel direction IT over an initial length TL. It then has a 90° turn to follow the contour of the first square 114A over a first side of the square 114A, over a second side of the square 114A after a 90° turn, then over a third side of the square 114A after another 90° turn and lastly, over a fourth side of the square 114A after a 90° turn. On the fourth side, the trajectory moves away from the first connecting segment 116A, perpendicular thereto, by a distance equal to the line spacing LS.

The trajectory 112 then leaves the contour of the first square 114A along a connecting segment 116B in the extension of the fourth side of the first square 114A to reach the contour of the second square 114B and follow its sides as previously described.

In this example, the exit point EP is situated in the extension of the fourth side of the second square 114B. The trajectory 112 therefore has a radius R, taken to be equal to the distance separating the starting point SP from a side of the square 114B furthest from the starting point, perpendicular to the initial trajectory IT.

Figure 6:
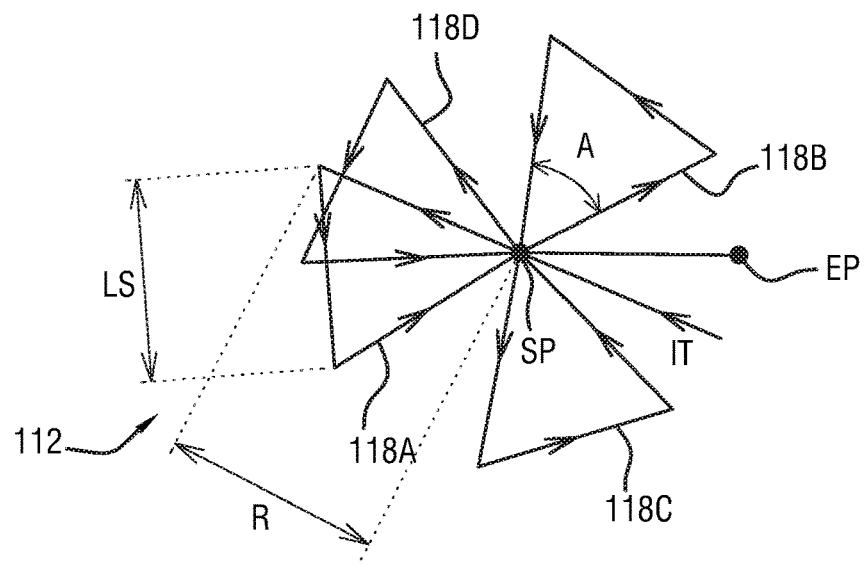

FIG. 6 illustrates another example so-called "sector" search and rescue trajectory 112.

This trajectory is for example suitable for searching for a ship or man overboard whose last position is known with relative precision both in terms of date and position, and for which the search zone is not too large.

The trajectory 112 follows angular sectors 118A to 118D, each angular sector 118A to 118D being defined by an isosceles triangle with an apex equal to the starting point SP, an angular expanse defined by an angle A, a base defined by a line spacing LS, and a side defined by a trajectory radius R. The first sector 118A is defined by the initial travel direction IT. The angles at the base of each angular sector 118A to 118B are defined from the angle A.

From the starting point SP, the trajectory 112 follows the side of a first angular sector 118A along an initial direction IT over a distance equal to the radius R. The trajectory 112 next has a turn by an angle equal to the angle at the base of the isosceles triangle with apex SP and apical angle A. Then, the trajectory follows the base of the isosceles triangle over a distance equal to LS, and next, over the opposite side of the isosceles triangle to the starting point SP.

The trajectory 112 extends aligned with the second side to follow the second angular sector 118B, then the third angular sector 118C after passing through the starting point SP, and lastly the fourth angular sector 118D after passing again through the starting point SP.

Figure 7:
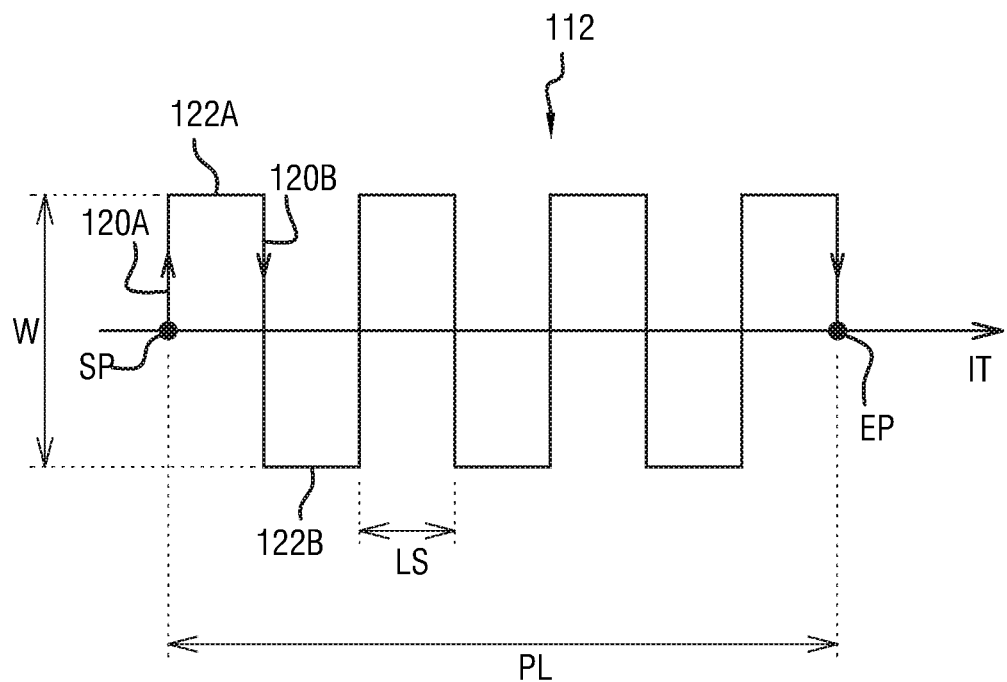

FIG. 7 illustrates another so-called "creeping ladder" search and rescue trajectory 112.

This trajectory 112 is for example intended to search for a man overboard from a boat, by following the movement direction of said boat.

This trajectory 112 advances globally in an initial direction IT from a starting point SP while zigzagging around the initial direction IT.

Aside from the starting point SP and the initial direction, this trajectory 112 is defined by a width W, a path length PL, and a line spacing LS. It is also defined by a first turning direction at the starting point (in the clockwise direction or the counterclockwise direction).

Initially, the trajectory 112 starts at the starting point SP along an initial transverse segment 120A perpendicular to the direction IT, over a distance equal to a half-width W/2.

It then comprises a 90° turn, and a longitudinal segment 122A with a length equal to the line spacing LS with a new 90° turn. It next comprises another transverse segment 120B that traverses the direction IT and that has a width equal to W. It then comprises a new 90° turn to perform a new longitudinal segment 122B situated opposite the first longitudinal segment 122A relative to the direction IT and in front of the first longitudinal segment 122A along the direction IT. This pattern is then repeated until the exit point EP is reached.

Figure 8:
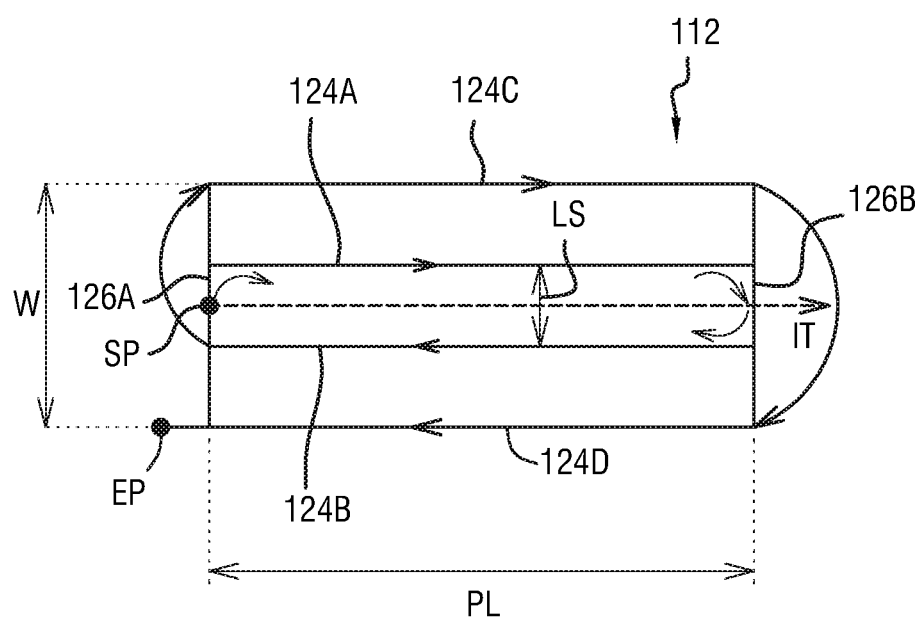

FIG. 8 illustrates a so-called "parallel" search and rescue trajectory 112.

This trajectory is for example suitable for searching for a shipwreck when the location thereof is uncertain.

It is defined by a starting point SP, an initial trajectory IT and a line spacing LS between the various segments 124A to 124D parallel to the initial direction IT, by a trajectory length PL and by a trajectory width W. It is also defined by a turning direction (in the clockwise direction or the counterclockwise direction).

The trajectory 112 starts from a starting point while moving along a transverse segment 126A perpendicular to the initial direction IT over a distance equal to half of the line spacing LS.

It then comprises a first segment 124A parallel to the initial direction IT over the length PL, before a 90° turn and a second transverse segment 126B with a length equal to the line spacing LS. It next comprises a third 90° turn to return to the starting point SP by following a second segment 124B parallel to the initial direction IT, in the direction opposite the first segment 124A at a distance equal to the line spacing LS of the first parallel segment 124A. It next comprises a 90° turn to follow another transverse segment including the first transverse segment 126A passing through the starting point SP, over a distance equal to two times the line spacing LS.

It next includes a third parallel segment 124C, parallel to the first segment 124A and spaced away from the latter separated from the starting point SP by a distance equal to LS, over a length equal to PL. The trajectory 112 then comprises a 90° turn, another transverse segment passing through the second transverse segment 126B and extending over a distance equal to three times the line spacing LS. It next comprises a fourth parallel segment 124D spaced away from the second parallel segment 124B separated from the starting point SP by a distance LS.

The search and rescue trajectories 112 are conducted at low altitudes relative to the ground, for example comprised between 1524 m (5000 feet) and 91 m (300 feet), and periodically up to 30 m (100 feet) above the ground.

In a known manner, the avionics system 10 receives data from sensors 14 of the aircraft in particular including sensors 16, 18 for measuring evolution parameters of the aircraft.

These sensors 16, 18 in particular include a radio-altimeter intended to measure in altitude $H_{ra}$ of the aircraft relative to the ground, an inertial unit intended in particular to measure a vertical speed $V_Z$ of the aircraft and a geographical position of the aircraft. The sensors for measuring evolution parameters of the aircraft also include anemometric and barometric sensors intended to measure and airspeed and a pressure altitude, respectively.

The sensors 14 of the aircraft also comprise at least one sensor 20 for determining a configuration of the aircraft, in particular a sensor for detecting the deployment of the landing gear, a sensor for detecting the deployment of the foil flaps, and/or a sensor for detecting a slope guide signal.

The avionics system 10 comprises a flight management system 30, in particular able to guide the piloting of the aircraft during a search and rescue mission, an automatic piloting system 31, able to switch between a manual piloting configuration and an automatic piloting configuration, and a ground proximity warning system 32, intended to protect the aircraft from collision risks with the ground, during normal flight and during a search and rescue mission.

The warning system 32 includes a processor 40 and a memory 42 receiving software modules and/or applications able to be run by the processor 40.

Thus, the memory 42 contains a data recovery unit in the form of a software module 44 for recovering data coming from the sensors 16, 18 for measuring evolution parameters of the aircraft and data coming from sensors 20 for determining a configuration of the aircraft.

The memory 42 further contains a plurality of ground proximity alarm generators 46 to 58, each able to generate the emission of an alarm by verifying evolution conditions of the aircraft specific to each alarm generator 46 to 58, by using data obtained from the measuring sensors 16, 18, 20.

Preferably, the memory 42 further contains a terrain database 59 containing geographical indications on the terrain overflown by the aircraft.

Memory 42 further contains selective deactivation unit in the form of a module 60 for selective deactivation of at least some of the alarm generators 46 to 58, able to be implemented during a search and rescue mission, and an auxiliary alarm generator 62, capable of emitting a ground proximity alarm based on a safety height SH chosen for a search and rescue mission, when the selective deactivation module 60 is implemented.

The memory further contains an interface and adjustment module 64, able to allow the implementation of the selective deactivation module 60 and the adjustment of the safety height.

The recovery module 44 is in particular able to recover the altitude $H_{ra}$, relative to the ground, vertical speed $V_Z$ and aircraft position data coming from the sensors 16, 18 for measuring evolution parameters of the aircraft.

It is also able to collect the data from the sensors 20 for determining the configuration of the aircraft, detecting whether the landing gear is deployed, whether the foil flaps are deployed, and/or whether a slope guide signal is received.

The alarm generators 46 to 58 are able to receive the data from the sensors 16, 18, 20 via the recovery module 44.

Each alarm generator 46 to 58 is able to perform an evolution test of the aircraft, specific to the alarm generator 46 to 58, involving at least one condition to be verified, based on data from the sensors 16, 18, 20.

If the condition is not verified, each alarm generator 46 to 58 is able to generate an alarm intended to be sent to the crew, in the form of a sound signal, a visual indication, and/or a tactile stimulus.

Traditionally, a first alarm generator 46 is an excessive sink rate generator. The first alarm generator 46 is able to test whether the pair made up of the altitude relative to the ground $H_{ra}$ and the vertical speed $V_Z$ measured by the sensors 16, 18 is in a predetermined range of altitude relative to the ground $H_{ra}$ and vertical speed $V_Z$ values. It is able to generate a preventive excessive sink rate alarm in a first region of the range, then a pull-up alarm in a second region of the range. This generator 46 generally operates at an altitude below 762 m (2500 feet).

The second alarm generator 48 is for example able to determine excessive closeness to the ground, based on position data of the aircraft, vertical speed $V_Z$ data and altitude relative to the ground $H_{ra}$ data of the aircraft measured by the sensors 16, 18 and the terrain database 59.

It is able to generate a preventive terrain closeness alarm in a first range of closeness, then a pull-up alarm in a second range of closeness.

A third alarm generator 50 is for example able to determine an excessive loss of altitude after takeoff, or with a high engine rating, based on altitude relative to the ground $H_{ra}$ data, vertical speed $V_Z$ data, coming from configuration data sensors 16, 18 of the aircraft measured by the sensors 20, to determine the relevant flight phase.

A fourth alarm generator 52 is able to determine a crossing of dangerous terrain, based on position data of the aircraft, altitude data $H_{ra}$ and vertical speed data $V_Z$ of the aircraft derived from the sensors 16, 18 and terrain data extracted from the database 49. This crossing calculation is done independently of the speed toward the ground.

It is able to generate specific alarms when the approach toward the ground is detected while the landing gear is not deployed or when the foil flaps are not deployed, based on configuration data of the aircraft coming from the sensors 20.

A fifth alarm generator 54 is able to determine an excessive deviation relative to a slope guide signal received by the aircraft, in particular when approaching a landing strip, based on altitude data $H_{ra}$ and vertical speed data $V_Z$ from the sensors 16, 18 and based on the guide signal received by the aircraft. It is able to generate an alarm if the deviation relative to the trajectory defined by the slope guide signal is above a given threshold.

A sixth alarm generator 56 is able to detect an excessive roll angle of the aircraft, based on data from the sensors 16, 18, and to generate an alarm if the roll exceeds a given threshold.

A seventh alarm generator 58 is able to detect a wind shear condition, based on data received from the sensors 16, 18 and optionally radar data. It is able to emit a wind shear alarm when a wind shear condition is encountered.

The deactivation module 60 is able to be implemented to deactivate at least one of the alarm generators 46 to 58, preferably a plurality of alarm generators from among the alarm generators 46 to 58, during a search and rescue mission carried out by the aircraft. It is able to activate, in place of the deactivated alarm generator(s), the auxiliary alarm generator 62.

As will be seen below, the deactivation module 60 can be controlled by the crew between an initial civilian configuration, in which all of the alarm generators 46 to 58 are active, and a military configuration for implementing a search and rescue mission.

In this implementing configuration, the deactivation module 60 is for example able to deactivate the alarm generators, which consult the terrain database 59, such as the second alarm generator 48 and the fourth alarm generator 52.

It is further able to deactivate the third alarm generator 50 relative to the loss of altitude during takeoff or with a high engine rating, and the sixth alarm generator 56 relative to the excessive roll angle.

The deactivation module 60 is able to keep at least one alarm generator active among the alarm generators 46 to 58, even in the configuration for carrying out a search and rescue mission.

In this example, in the configuration for carrying out a search and rescue mission, the deactivation module 60 is able to keep only the first alarm generator 46 active for the excessive sink rate.

In one alternative, it is also able for example to keep the fourth alarm generator 52 active for crossing dangerous terrain and/or the seventh alarm generator 58 for wind shear.

The auxiliary alarm generator 62 is able to determine a ground proximity condition as a function of the selected safety height SH, the altitude $H_{ra}$ measured by the first measuring sensor 16, the vertical speed $V_Z$ of the aircraft measured by the second measuring sensor 18, and a predetermined anticipation time $T_{ant}$.

In particular, it is able to calculate a predicted altitude $H_p$ of the aircraft relative to the ground once the anticipation time $T_{ant}$ is elapsed as a function of the altitude $H_{ra}$ of the aircraft measured by the first sensor 16, the vertical speed $V_Z$ of the aircraft measured by the second sensor 18 and the predetermined anticipation time $T_{ant}$, and to test whether the selected safety height SH is less or greater than the predicted altitude $H_p$.

The predicted altitude $H_p$ is for example calculated using equation (1) below:

$$H_p = H_{ra} - (V_Z \times T_{ant}).$$

The anticipation time $T_{ant}$ is advantageously constant and not zero, for example comprised between two seconds and three seconds, up to a threshold altitude (for example, 213 m (700 feet)), then is zero beyond the threshold altitude.

Figure 4:
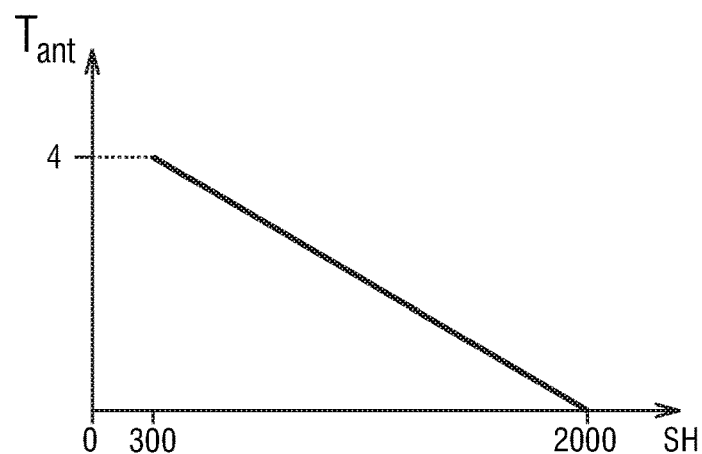
FIG. 4 illustrates an example law for determining an anticipation time as a function of the safety height.

Alternatively, the anticipation time $T_{ant}$ is determined according to a law that is a decreasing function of the selected safety height SH, for example a decreasing affine function of the selected safety height SH, as illustrated in FIG. 4.

In this alternative, the value of the anticipation time for example varies from a value greater than three seconds, and in particular comprised between three seconds and five seconds for a safety height equal to 91 m (300 feet), and below a zero value, for a safety height greater than or equal to 610 m (2000 feet).

The alarm generator 62 is able to generate an alarm when the predicted altitude $H_p$ reaches the selected safety height SH.

Figure 2:
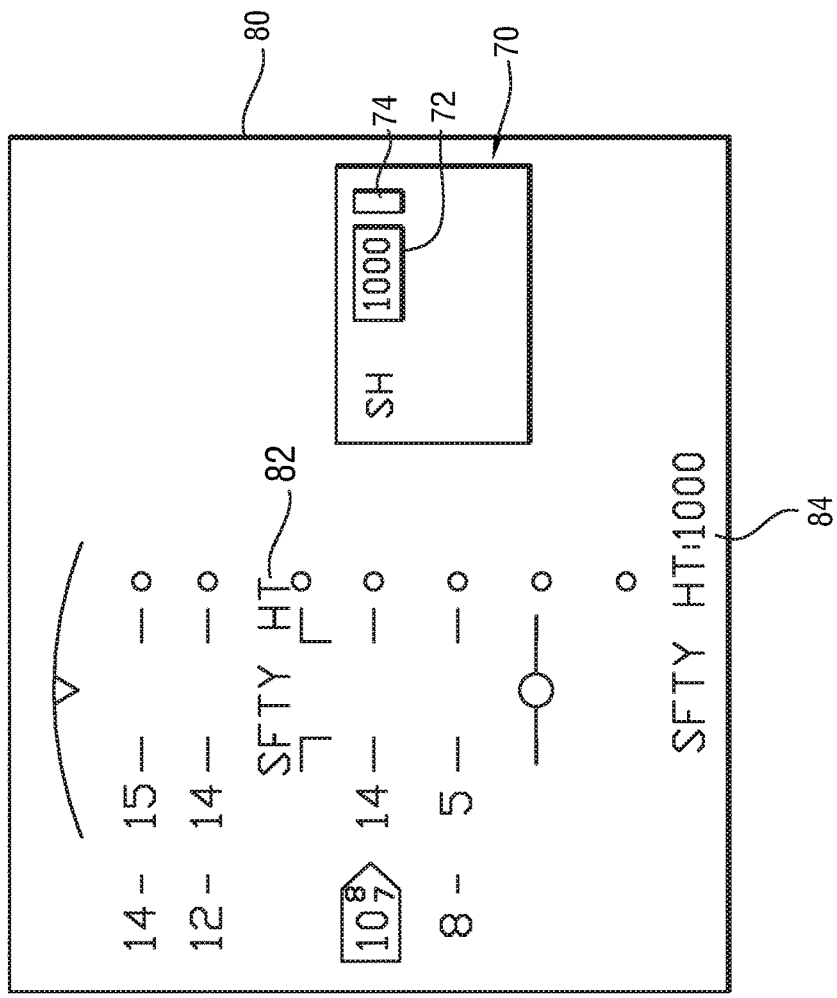
FIG. 2 illustrates a window for a crew member to adjust a safety height.

The interface and adjusting module 64 is able to generate the display, on a monitor for tracking flight or navigation parameters, of a window 70 for adjusting the safety height SH, for example visible in FIG. 2.

The adjusting window 70 includes an entry region 72 for a safety height SH, optionally a button 74 for modifying the safety height SH displayed in the entry region 72. The value of the selected safety height SH is able to be entered by a crew member using a command member, such as a cursor control device (CCD) or a multifunctional keyboard (MKD).

The value of the selected safety height SH is able to be entered in the mission implementation configuration. In this case, the auxiliary alarm generator 62 is able to take account of the entry value at the end of entry, advantageously without other validation by the crew.

The value of the selected safety height is also able to be entered in the initial configuration, before carrying out the mission. In this case, the auxiliary alarm generator 62 is able to take account of the safety height value SH entered when the deactivation module 60 goes from the initial configuration to the mission implementation configuration.

Figure 3:
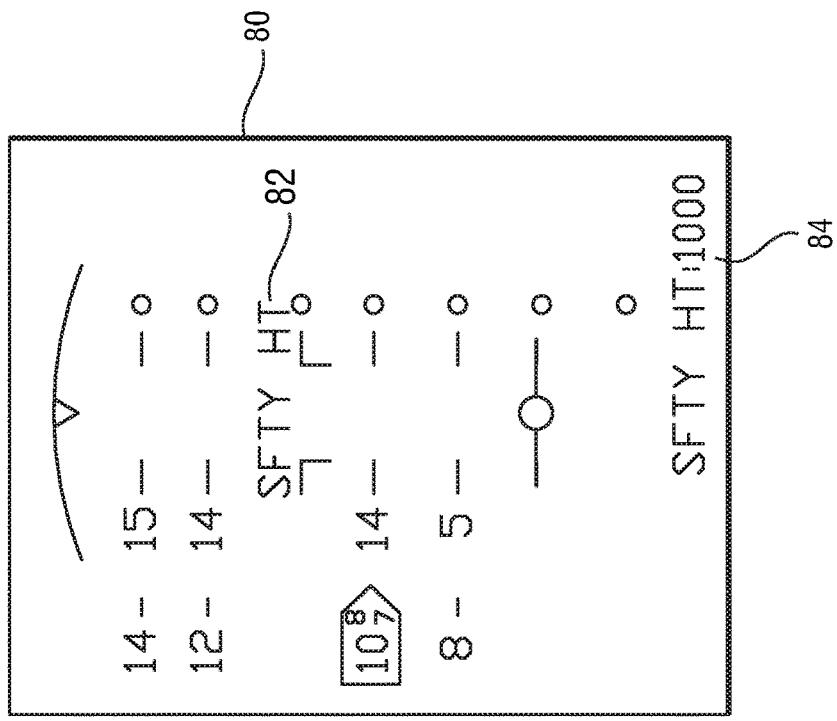
FIG. 3 illustrates the display on a piloting screen of the cockpit of an indication for implementing an auxiliary alarm generator, based on the safety height.

In reference to FIG. 3, the interface and adjusting module 64 is further able to generate the display, on a screen 80 for tracking flight or navigation parameters, of an indication 82 of the deactivation of part of the alarm generators 46 to 58, and activation of the auxiliary generator 62. The interface and adjusting module 64 is also able to display, on the screen 80, an indication 84 of the selected safety height SH.

In the example shown in FIG. 3, the tracking screen 80 is a screen for tracking flight parameters, on which at least one of the following graphic elements is displayed: altitude indicator, horizontal situation indicator, airspeed, altitude, vertical speed, corrected airspeed, engine information, lift configuration of the aircraft.

As illustrated in FIG. 1, the flight management system 30 comprises a processor 86 and a memory 88 containing software applications able to be run by the processor 86. It comprises a man-machine interface 87.

The man-machine interface 87 properly comprises a screen, here the screen 80, and an element 87A for selecting and entering data on the screen 80, such as a virtual or real keyboard, and/or a touch-sensitive area of the screen.

In this example, the memory 88 contains at least one application 90 for implementing guiding modes of the aircraft, and an application 92 for communicating with the warning system 32.

The application 90 for implementing guiding modes is able to allow the crew to go from a normal piloting mode to at least one search and rescue mission mode.

The communication application 92 with the warning system 31 is able to pilot the warning system 32 as a function of the guiding mode activated by the implementing application 90.

In the normal piloting mode, the communication application 92 is able to cause the warning system 32 to operate with all of the alarm generators 46 to 58 active. The selective deactivating module 60 is inhibited and cannot be activated by the crew.

In the search and rescue mission mode, the communication application 92 is able to implement, by default, the selective deactivation module 60 in order to deactivate at least some of the alarm generators 46 to 58, and to activate the auxiliary alarm generator 62, with a predefined safety height for example equal to 610 m (2000 feet).

In this mode, the communication application 92 is further able, upon command by the crew, to allow the display of the adjusting window 70, for example on the screen 80 of the man-machine interface 87, to allow the adjustment of the safety height SH by the crew.

The operation of the avionics system 10 according to an embodiment of the invention during a search and rescue mission will now be described.

Initially, the aircraft is piloted to go to the mission site. The flight management system 30 is kept in normal piloting mode.

When the search and monitoring mission begins, the pilot lowers the aircraft to a first mission activation altitude, for example 762 m (2500 feet).

He then activates the search and monitoring mission mode using the man-machine interface 87, by using the application 90 for implementing guiding modes.

He then activates the adjusting window 70 and enters a test safety height SH, for example 609 m (2000 feet), located below the first altitude. The communication application 92 then implements the selective deactivation module 60.

The interface and adjusting module 64 then commands the display, on a screen 80, of an indication 82 of the deactivation mode of some of the alarm generators 46 to 58, and activation of the auxiliary generator 62, here embodied by the indication "SFTY HT".

The interface and adjusting module 64 also displays, on the screen 80, an indication 84 of the selected safety height SH.

The implementation of the selective deactivation module 60 also causes the deactivation of at least some of the alarm generators 46 to 58. In this example, another portion of the alarm generators 46 to 58 is kept active.

For example, as indicated above, the deactivation module 60 deactivates the alarm generators consulting the terrain database 59, such as the second alarm generator 48 or the fourth alarm generator 52. It further deactivates the third alarm generator 50 relative to the loss of altitude during takeoff or with a high engine rating, and the sixth alarm generator 56 relative to the excessive roll angle.

The deactivation module 60 keeps only the first alarm generator 46 active for the excessive sink rate.

In one alternative, it also keeps the fourth alarm generator 52 active for crossing dangerous terrain and/or the seventh alarm generator 58 for wind shear.

Furthermore, the selective deactivation module 60 activates the auxiliary alarm generator 62.

The pilot then lowers the aircraft below the selected safety height SH to test the proper operation of the auxiliary alarm generator 62.

The data coming from the sensors 16, 18 are then recovered continuously by the recovery module 44. In particular, the height $H_{ra}$ relative to the ground measured by the first sensor 16 and the vertical speed $V_Z$ measured by the sensor 18 are sent to the auxiliary alarm generator 62.

The auxiliary alarm generator 62 then applies the anticipation time $T_{ant}$ as a function of the selected safety height SH, optionally based on the law defining the anticipation time $T_{ant}$. Then, the auxiliary alarm generator 62 calculates the predicted altitude $H_p$ from the measured altitude relative to the ground $H_{ra}$, the measured vertical speed, and the anticipation time, in particular using equation (1) above.

When the value of the predicted altitude $H_p$ is greater than the safety height SH, no alarm is emitted by the auxiliary alarm generator 62.

Conversely, if the value of the predicted altitude $H_p$ reaches the safety height SH, an alarm is generated by the auxiliary alarm generator 62, causing a sound signal, a visual indication and/or a tactile stimulus to be emitted.

Once this test is done, the crew adjusts the safety height SH to a threshold located below the minimum authorized altitude Am during flight to perform the mission, for example 10% below this minimum altitude Am. The selected safety height SH is for example at least 27 m (90 feet) during the day and under good weather conditions, or 82 m (270 feet) at night or with poor weather conditions.

If the aircraft deviates from its trajectory, the crew is thus immediately warned of the proximity to the ground and can correct the aircraft's trajectory.

If the aircraft flies at a sufficient altitude, greater than a safety height SH threshold value, for example 152 m (500 feet), the pilot can activate the automatic piloting system 31 to switch it to the automatic pilot configuration.

Optionally, when the mission involves flying lower, the pilot returns the automatic piloting system 31 to the manual piloting configuration.

The warning system 32 is therefore highly adapted to search and rescue missions, since it makes it possible both to deactivate the alarm generators that may generate false alarms, disruptive for the crew during the mission, while maintaining the most useful alarm generators for safety purposes.

Furthermore, the warning system 32 includes an auxiliary alarm generator 62 that is particularly suitable for search and rescue missions, which guarantees adequate safety for the aircraft, without triggering needless alarms.

The crew of the aircraft can therefore focus on carrying out the mission, and tracking search and rescue trajectories 112, while benefiting from optimal safety for the performance of this mission.

What is claimed is:

1. An aircraft ground proximity warning system comprising a computer having a processor and a memory containing software modules to be executed by the processor, the software modules comprising:
    a data recovery software module configured to recover data coming from at least one sensor measuring an evolution parameter of an aircraft;
    a plurality of alarm generators, each configured to generate an alarm by verifying evolution conditions of the aircraft specific to each alarm generator, the verification using data obtained from the at least one sensor;
    a deactivation software module configured to deactivate at least some of the alarm generators, the deactivation software module being configured to be implemented during a search and rescue mission conducted by the aircraft; and
    an auxiliary alarm generator configured to emit a ground proximity alarm as a function of a safety height selected for the search and rescue mission when the deactivation software module is implemented,
    the deactivation software module being configured to remain in an idle configuration in which the alarm generators of the plurality of alarm generators are active and in which the auxiliary alarm generator is inactive, in a normal piloting mode and being configured to be implemented in a search and rescue mission mode to deactivate at least one of the plurality of alarm generators and to activate, in place of the deactivated alarm generator, the auxiliary alarm generator,
    the aircraft ground proximity warning system being configured such that the deactivation software module is implementable upon activation of the search and rescue mode by a crew of the aircraft, implementation of the deactivation software module during the search and rescue mode causing deactivation of at least one of the plurality of alarm generators to prevent the deactivated at least one alarm from emitting an alarm and causing activation of the auxiliary alarm generator to cause the auxiliary alarm generator to emit the ground proximity alarm as a function of the selected safety height.

2. The system according to claim 1, further comprising an adjustment software module configured to allow a crew member to adjust the safety height.

3. The system according to claim 2, wherein the safety height is selectable at least between 15 m and 762 m.

4. The system according to claim 1, further comprising an interface software module configured to cause an indication to be displayed on a flight or navigation parameter tracking screen during the implementation of the deactivation software module, the indication indicating some of the alarm generators have been deactivated.

5. The system according to claim 1, wherein the at least one sensor includes a first sensor and a second sensor, the first sensor being an altitude measuring sensor of the aircraft and the second sensor being an aircraft vertical speed measuring sensor.

6. The system according to claim 5, wherein the auxiliary alarm generator is configured to emit the ground proximity alarm as a function of the safety height, the altitude measured by the first sensor, the vertical speed of the aircraft measured by the second sensor, and a predetermined anticipation time.

7. The system according to claim 6, wherein the auxiliary alarm generator is configured to compare the safety height to the difference between the altitude, measured by the first sensor, and the product of the vertical speed of the aircraft, measured by the second sensor, multiplied by the predetermined anticipation time.

8. The system according to claim 7, wherein the predetermined anticipation time is determined as a function of the selected safety height.

9. The system according to claim 7, wherein the predetermined anticipation time is comprised between 5 seconds and 0 seconds.

10. The system according to claim 1, wherein the deactivation software module keeps at least one of the alarm generators active during the search and rescue mission.

11. The system according to claim 10, wherein the at least one alarm generator kept active is chosen from among an excessive sink rate alarm generator, an alarm generator for excessive deviation with respect to a slope guide signal, an alarm generator for crossing dangerous terrain and a wind shear alarm generator.

12. An avionics, comprising:
    a flight management system, configured to be switched between a normal piloting mode and a search and rescue mission mode;
    an aircraft ground proximity warning system comprising a computer having a processor and a memory containing software modules to be executed by the processor, the software modules comprising:
        a data recovery software module configured to recover data coming from at least one sensor measuring an evolution parameter of an aircraft;
        a plurality of alarm generators, each configured to generate an alarm by verifying evolution conditions of the aircraft specific to each alarm generator, the verification using data obtained from the at least one sensor;
        a deactivation software module configured to deactivate at least some of the alarm generators, the deactivation software module being configured to be implemented during a search and rescue mission conducted by the aircraft; and
        an auxiliary alarm generator configured to emit a ground proximity alarm as a function of a safety height selected for the search and rescue mission when the deactivation software module is implemented,
        the deactivation software module being configured to remain in an idle configuration in which the alarm generators of the plurality of alarm generators are active and in which the auxiliary alarm generator is inactive, in the normal piloting mode and being configured to be implemented in the search and rescue mission mode to deactivate at least one of the plurality of alarm generators and to activate, in place of the deactivated alarm generator, the auxiliary alarm generator, the aircraft ground proximity warning system being configured such that the deactivation software module is implementable upon activation of the search and rescue mode by a crew of the aircraft, implementation of the deactivation software module during the search and rescue mode causing deactivation of at least one of the plurality of alarm generators to prevent the deactivated at least one alarm from emitting an alarm and causing activation of the auxiliary alarm generator to cause the auxiliary alarm generator to emit the ground proximity alarm as a function of the selected safety height.

13. A ground proximity warning method for an aircraft, comprising:

providing an aircraft ground proximity warning system comprising a computer having a processor and a memory containing software modules to be executed by the processor, the software modules comprising:

a data recovery software module configured to recover data coming from at least one sensor measuring an evolution parameter of an aircraft;

a plurality of alarm generators, each configured to generate an alarm by verifying evolution conditions of the aircraft specific to each alarm generator, the verification using data obtained from the at least one sensor;

a deactivation software module configured to deactivate at least some of the alarm generators, the deactivation software module being configured to be implemented during a search and rescue mission conducted by the aircraft; and an auxiliary alarm generator configured to emit a ground proximity alarm as a function of a safety height selected for the search and rescue mission when the deactivation software module is implemented, the deactivation software module being configured to remain in an idle configuration in which the alarm generators of the plurality of alarm generators are active and in which the auxiliary alarm generator is inactive, in the normal piloting mode and being configured to be implemented in a search and rescue mission mode to deactivate at least one of the plurality of alarm generators and to activate, in place of the deactivated alarm generator, the auxiliary alarm generator;

during a search and rescue mission, deactivating at least some of the alarm generators, via the deactivation software module; and emitting, via the auxiliary alarm generator, the ground proximity alarm as a function of the safety height chosen for the search and rescue mission when the deactivation software module is implemented, the aircraft ground proximity warning system being configured such that the deactivation software module is implementable upon activation of the search and rescue mode by a crew of the aircraft, implementation of the deactivation software module during the search and rescue mode causing deactivation of at least one of the plurality of alarm generators to prevent the deactivated at least one alarm from emitting an alarm and causing activation of the auxiliary alarm generator to cause the auxiliary alarm generator to emit the ground proximity alarm as a function of the selected safety height.

14. The method according to claim 13, further comprising adjusting the chosen safety height via a crew member using an adjustment software module configured for adjusting the safety height.

15. The method according to claim 13, comprising emitting the ground proximity alarm, via the auxiliary alarm generator, as a function of the safety height, a measured altitude of the aircraft, a measured vertical speed of the aircraft, and a predetermined anticipation time.

* * * * *